(12) United States Patent
Jin et al.

(10) Patent No.: US 8,351,424 B2
(45) Date of Patent: *Jan. 8, 2013

(54) METHOD, DEVICE, AND SYSTEM FOR TRANSFERRING SERVICE CONTROL SIGNALLING PATH

(75) Inventors: Hui Jin, Shenzhen (CN); Shuiping Long, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,436

(22) Filed: Oct. 12, 2010

(65) Prior Publication Data

US 2011/0026518 A1 Feb. 3, 2011

Related U.S. Application Data

(63) Continuation of application No. PCT/CN2009/072157, filed on Jun. 5, 2009.

(30) Foreign Application Priority Data

Jun. 13, 2008 (CN) .......................... 2008 1 0111287

(51) Int. Cl.
*H04L 12/66* (2006.01)
*H04L 12/28* (2006.01)

(52) U.S. Cl. ....................................... 370/352; 370/410

(58) Field of Classification Search .......... 370/352–359, 370/384, 410, 389
See application file for complete search history.

(56) References Cited

U.S. PATENT DOCUMENTS

| | | |
|---|---|---|
| 2003/0128714 A1* | 7/2003 | Mio et al. ...................... 370/437 |
| 2005/0026615 A1 | 2/2005 | Kim |
| 2008/0205267 A1 | 8/2008 | El Barachi et al. |
| 2008/0267385 A1 | 10/2008 | Provost et al. |
| 2009/0097398 A1 | 4/2009 | Vergara et al. |
| 2009/0098853 A1 | 4/2009 | Mutikainen et al. |
| 2009/0196286 A1 | 8/2009 | Long et al. |
| 2009/0257418 A1 | 10/2009 | Allen et al. |
| 2009/0276532 A1 | 11/2009 | Bishop |
| 2011/0009120 A1 | 1/2011 | You et al. |

(Continued)

FOREIGN PATENT DOCUMENTS

CN 1756242 4/2006

(Continued)

OTHER PUBLICATIONS

International Search Report, mailed Sep. 17, 2009, in corresponding International Application No. PCT/CN2009/072157 (4 pp).

(Continued)

*Primary Examiner* — Andrew Lee

(57) ABSTRACT

A method, device, and system for transferring a Service Control Signalling Path are provided. The method for transferring a Service Control Signalling Path includes: establishing a connection with an opposite end by a User Equipment (UE), where the UE uses a Circuit Switched (CS) bearer in a CS network and a Service Control Signalling Path in a first Packet Switched (PS) network; sending a transfer request via a second PS network, to instruct a network side to transfer the Service Control Signalling Path according to the transfer request. Thus, the UE can replace a current Gm reference point with a Gm reference point of a new and available PS network when the PS network where the current Gm reference point is located is unavailable, so as to ensure smooth data transmission.

9 Claims, 6 Drawing Sheets

U.S. PATENT DOCUMENTS

| | | |
|---|---|---|
| 2011/0058520 A1 | 3/2011 | Keller et al. |
| 2011/0167441 A1 | 7/2011 | Xia |
| 2011/0202666 A1 | 8/2011 | Heidermark et al. |
| 2011/0206010 A1 | 8/2011 | Keller et al. |
| 2011/0211525 A1* | 9/2011 | Mahdi .......................... 370/328 |
| 2011/0280217 A1 | 11/2011 | Drevon et al. |

FOREIGN PATENT DOCUMENTS

| | | |
|---|---|---|
| CN | 101102613 | 1/2008 |
| WO | WO2007/023358 | 3/2007 |
| WO | WO2007/023358 A3 | 3/2007 |
| WO | WO2007/045264 | 4/2007 |
| WO | WO2007/045264 A1 | 4/2007 |

OTHER PUBLICATIONS

3rd Generation Partnership Project; Technical Specification Group Core Network and Terminals; IP Multimedia (IM) Core Network (CN) subsystem IP Multimedia Subsystem (IMS) Service Continuity; Stage 3 (Release 9), 3GPP TS 24.237 V9.3.0 (Jun. 2010), pp. 1-229.

Written Opinion of the International Searching Authority, mailed Sep. 17, 2009, in corresponding International Application No. PCT/CN2009/072157 (3 pp.).

Search report issued in corresponding United Kingdom patent application No. GB1106654.5, dated Jun. 23, 2011, total 3 pages.

3rd Generation Partnership Project; Technical Specification Group Services and System Aspects; IP Multimedia Subsystem (IMS) Centralized Services; Stage 2 (Release 8), 3GPP TS 23.292 V8.0.0, Jun. 2008, pp. 1-89.

Extended European Search Report, mailed Jan. 31, 2012, in corresponding European Application No. 09761273.3 (7 pp.).

Office Action, mailed Mar. 6, 2012, in corresponding U.S. Appl. No. 13/349,272 (10 pp.).

Second office action issued in corresponding U.S. Appl. No. 13/349,272, dated Sep. 25, 2012, total 18 pages.

* cited by examiner

METHOD, DEVICE, AND SYSTEM FOR TRANSFERRING SERVICE CONTROL SIGNALLING PATH

CROSS-REFERENCE TO RELATED APPLICATIONS

The application is a continuation of International Application No. PCT/CN2009/072157, filed on Jun. 5, 2009, which claims priority to Chinese Patent Application No. 200810111287.X, filed on Jun. 13, 2008, both of which are hereby incorporated by reference in their entireties.

FIELD OF THE TECHNOLOGY

The present invention relates to the field of wireless communication technologies, and more particularly to a method, device, and system for a Service Control Signalling Path.

BACKGROUND OF THE INVENTION

The conventional mobile communication networks are mainly Circuit Switched networks, including GSM and CDMA. Operators have established well-developed and abundant-service platforms based on the CS network, where a Mobile Switch Center (MSC) is in charge of call routing and service logic execution (for example, executing a forwarding service).

With the popularity and development of the network IP technology, IP multimedia service attracts more and more attentions, and the IP Multimedia Sub-system (IMS) for providing IP multimedia services is also promoted and developed. The IMS supports User Equipment (UE) to access the IMS to perform IMS services through various Packet Switched (PS) networks. Current PS networks are mainly IP capability access networks (IP-CAN) (such as the GPRS). The IMS is a service platform based on the IP-CAN, and has similar functions with the MSC of the CS network.

In view of the development trend, the IMS-based network will finally complete comprehensive deployment to replace the CS network. However, the IMS-based network is complex, and the complete deployment cannot be achieved in a short period of time, and moreover, it is unpractical to require all the CS network users to replace a new IMS terminal in a short period of time. Therefore, the IMS-based network will co-exist with the conventional CS network for a long time in the future. Under such condition, the simultaneous operation of the CS system and the IMS system will increase operation costs. Furthermore, if a new service is introduced, the CS system and the IMS system both need to be re-constructed, thus increasing construction costs. Therefore, a good method for solving the above problem is to transfer the function of the CS network system to the IMS network system to achieve uniformity between the systems, so as to reduce operation costs and construction costs for new services. Such a uniform system is referred to as IMS Centralized Service (ICS).

FIG. 1 shows the structure of an ICS system. As shown in FIG. 1, the network side includes a Server Centralization and Continuity Application Server (SCC AS), a Call Session Control Function (CSCF), a CS Access interface, an MSC Server, and a CS Media Gateway (CS-MGW).

The SCC AS is configured to provide an application server supported by the ICS service and perform the core ICS service logic control. The CSCF provides the core IMS session control function, and includes a Proxy-CSCF (P-CSCF), a Service-CSCF (S-CSCF), and an Interrogating-CSCF (I-CSCF). In the ICS system, the UE is required to establish an IMS call with voice media over a CS bearer, and the CS bearer is achieved by establishing a CS call between the UE and the SCC AS, in addition, the service processing logic in the MSC is weakened or removed. The SCC AS completes the adaptation from the CS domain signalling to the IMS domain Session Initial Protocol (SIP) signalling, and as a user agent, establishes and controls the IMS session in the IMS domain for the user. Between the UE and the SCC AS, a session control message is transferred through a signalling channel other than the CS call, and in different access network environments, different message transmission protocols may be used. When only the CS domain connection exists, the UE and the SCC AS perform information exchange through a Service Control Signalling Path (that is, I1 reference point) of the CS network. When the UE is in an IP-CAN connection without the Voice over Internet Protocol (VoIP) capability, the UE and the SCC AS perform information exchange through a Service Control Signalling Path (that is, Gm reference point) of the PS network. Compared with the I1 reference point, the Gm reference point has the advantages that large amount of information and rich content can be transmitted. In communication standards, it is recommended that when the Gm reference point and the I1 reference point are both available, the Gm reference point is preferred as a channel for session control message transmission.

In the implementation of the present invention, the inventor finds that the process of information exchange through the Gm reference point in the prior art at least has the following problems:

When the PS network where the Gm reference point is located is interrupted and thus is unavailable, the UE abandons the Gm reference point and uses the I1 reference point instead; when the amount of transmitted information is large and there is much content to be transmitted, such operation mode results in low transmission efficiency, and even some information cannot be transmitted.

SUMMARY OF THE INVENTION

Accordingly, the embodiments of the present invention are directed to a method, device, and system for transferring a Service Control Signalling Path, which solve the problem of low transmission efficiency in the prior art caused by abandoning a Gm reference point when the PS network where the currently used Gm reference point is located is interrupted.

The present invention is implemented as follows:

In an embodiment, the present invention provides a method for transferring a Service Control Signalling Path. The method includes the following steps: A connection is established, by User Equipment (UE), with an opposite end of the UE where the UE uses a Circuit Switched (CS) bearer in a CS network and a Service Control Signalling Path in a first Packet Switched (PS) network.

A transfer request is sent via a second PS network, to instruct a network side to transfer the Service Control Signalling Path according to the transfer request.

In an embodiment, the present invention provides another method for transferring a Service Control Signalling Path. The method includes the following steps:

A transfer request sent by a UE via a second PS network is received, where the UE uses a Circuit Switched (CS) bearer in a CS network and a Service Control Signalling Path in a first Packet Switched (PS) network.

A Service Control Signalling Path is transferred according to the transfer request.

Furthermore, in an embodiment, the present invention also provides a device for transferring a Service Control Signalling Path, where the device is disposed in a UE, and the UE uses a Circuit Switched (CS) bearer in a CS network and a Service Control Signalling Path in a first Packet Switched (PS) network. The device includes a first processing unit.

The first processing unit is configured to send a transfer request via second PS network, to instruct a network side to transfer the Service Control Signalling Path.

In an embodiment, the present invention also provides a UE. The UE includes the device for transferring a Service Control Signalling Path.

Furthermore, in an embodiment, the present invention provides another device for transferring a Service Control Signalling Path. The device includes an information receiving unit and a third processing unit.

The information receiving unit is configured to receive a transfer request from a UE, where the UE uses a Circuit Switched (CS) bearer in a CS network and a Service Control Signalling Path in a first Packet Switched (PS) network, and the transfer request is sent by the UE via a second PS network.

The third processing unit is configured to transfer the Service Control Signalling Path according to the transfer request.

In an embodiment, the present invention also provides network equipment. The network equipment includes the device for transferring a Service Control Signalling Path.

In an embodiment, the present invention also provides a communication system, which includes a UE side and a network side. The UE side includes a first UE and a second UE having a connection with the first UE, where the UE uses a Circuit Switched (CS) bearer in a CS network and a Service Control Signalling Path in a first Packet Switched (PS) network.

The first UE is configured to send a transfer request via a second PS network.

The network side is configured to receive the transfer request and transfer the Service Control Signalling Path according to the transfer request.

It can be seen from the technical solutions that, compared with the prior art, the present invention achieves the following: When the PS network where a current Gm reference point is located is unavailable, the UE does not need to abandon the Gm reference point and use a I1 reference point with small amount of data transmission, but perform a Gm reference point transfer from the current Gm reference point to the Gm reference point of a new and available PS network, so as to ensure smooth data transmission.

DETAILED DESCRIPTION OF THE EMBODIMENTS

Figure 1:
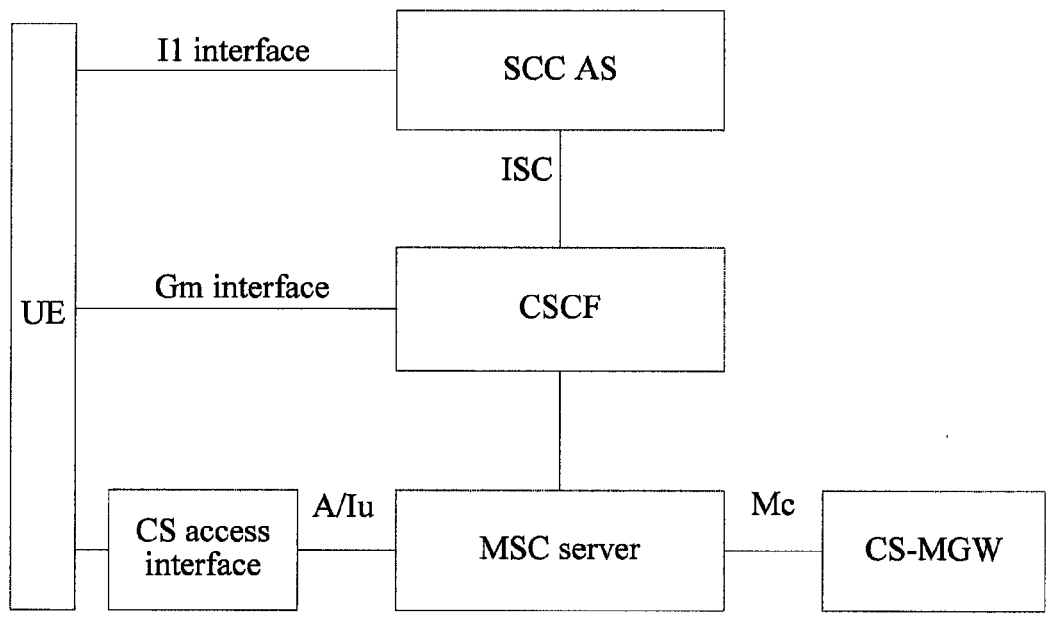
FIG. 1 is a structural view of an ICS system.
Figure 2:
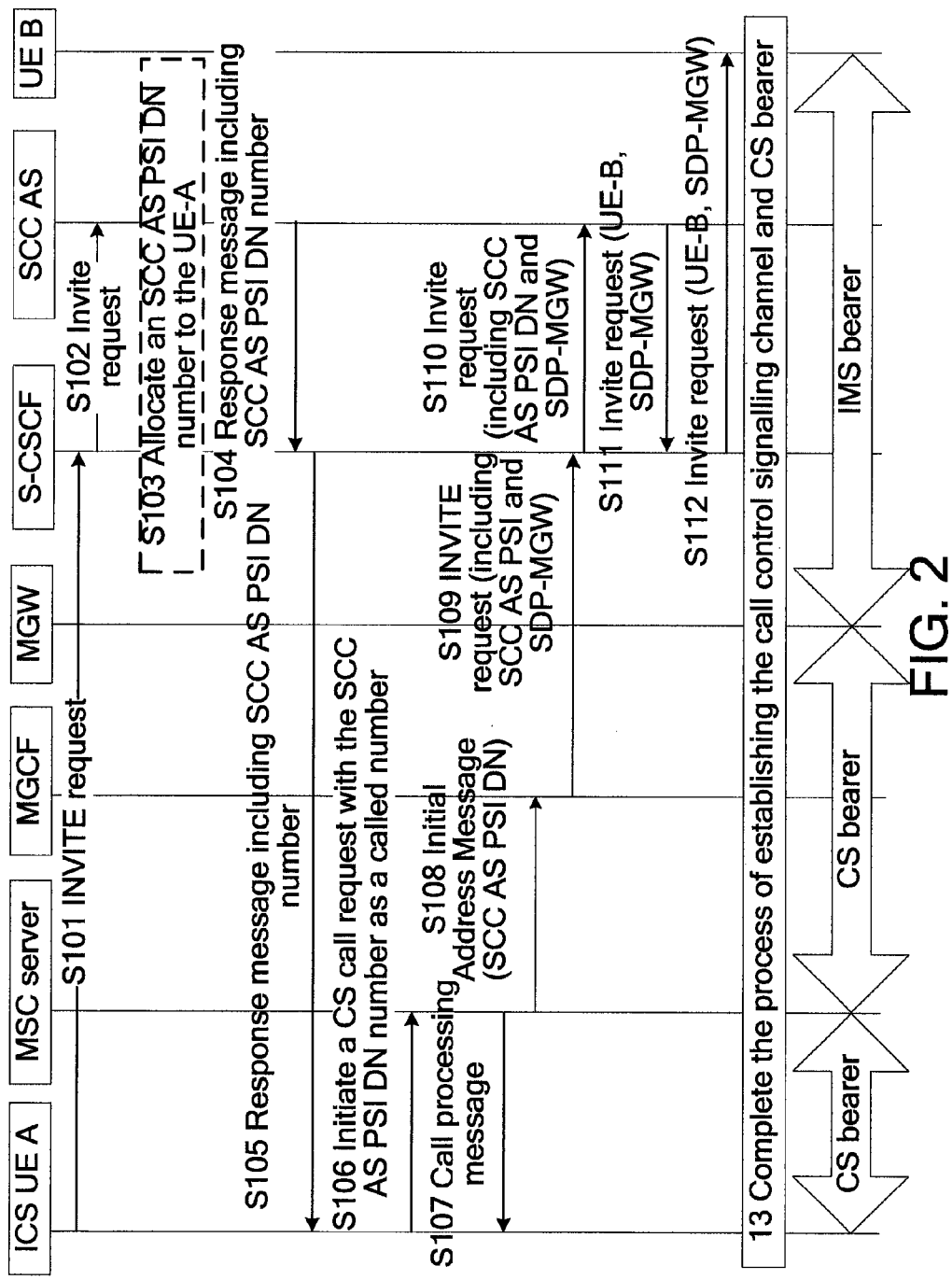
FIG. 2 is a flow chart of a session request process of an ICS UE-A through a Service Control Signalling Path of a first PS network.

When an ICS UE-A in an ICS system has a session with another UE (referred to as UE-B) in this embodiment, a session request process is initiated through a Service Control Signalling Path (that is, Gm reference point) of a first PS network, as shown in FIG. 2.

The process includes the following steps:

In step S101, the ICS UE-A initiates a service control signalling Invite request to the UE-B through the Gm reference point.

The ICS UE-A is an IMS terminal having enhanced ICS capability (including service control signalling exchange with an SCC AS and establishment of a bearer control signalling and a bearer). The Session Description Protocol (SDP) of the Invite request includes indication information indicating that the bearer is in the CS network, and the Invite request first arrives at a Serving-CSCF (S-CSCF) of the UE-A.

In step S102, the S-CSCF forwards the Invite request to the SCC AS.

In step S103, the SCC AS allocates an SCC AS PSI DN number to the UE-A, and the number is used to route a call initiated by the CS network to the SCC AS.

In step S104, the SCC AS sends the SCC AS PSI DN to the UE-A by using a response message, where the message first arrives at the S-CSCF.

In step S105, the S-CSCF sends the response message including the SCC AS PSI DN number to the UE-A.

In step S106, the UE-A initiates a CS call request message by using the SCC AS PSI DN number as a called number, where the message first arrives at an MSC Server.

In step S107, the MSC Server returns a call processing message.

In step S108, the MSC Server sends an Initial Address Message (IAM) to a Media Gateway Control Function (MGCF) according to the SCC AS PSI DN.

In step S109, the MGCF converts the IAM into an SIP Invite request, and sends the SIP Invite request to the S-CSCF, and the SDP information of the SIP Invite request includes media information of the MGW.

In step S110, the S-CSCF sends the SIP Invite request to the SCC AS.

In step S111, the SCC AS serves as a back-to-back user agent (B2BUA), associates the Invite request in step S102 and the SIP Invite request in step S110, combines the SDP messages in the two messages into one Invite request, and sends the Invite request to the UE-B, where the Invite request first arrives at the S-CSCF.

In step S112, the S-CSCF sends the combined Invite request to the UE-B.

In step S113, the establishment process of the service control signalling and the CS bearer is completed.

After the session request process is completed, the UE-A exchanges information with the UE-B through the Gm reference point and the SCC AS.

As the SCC AS stores mapping relationships of a UE-A identity, a Gm reference point identity, and a UE-B identity. When the UE-A needs to transfer the Gm reference point, the UE-A needs to notify the SCC AS of the identities of the original Gm reference point and the new Gm reference point, so that the SCC AS can update the stored mapping relationship to perform a Gm reference point transfer from the original Gm reference point to the new Gm reference point.

To make the technical solutions of the present invention more comprehensible to persons skilled in the art, the present invention is described in further detail with reference to embodiments and the accompanying drawings.

Figure 3:
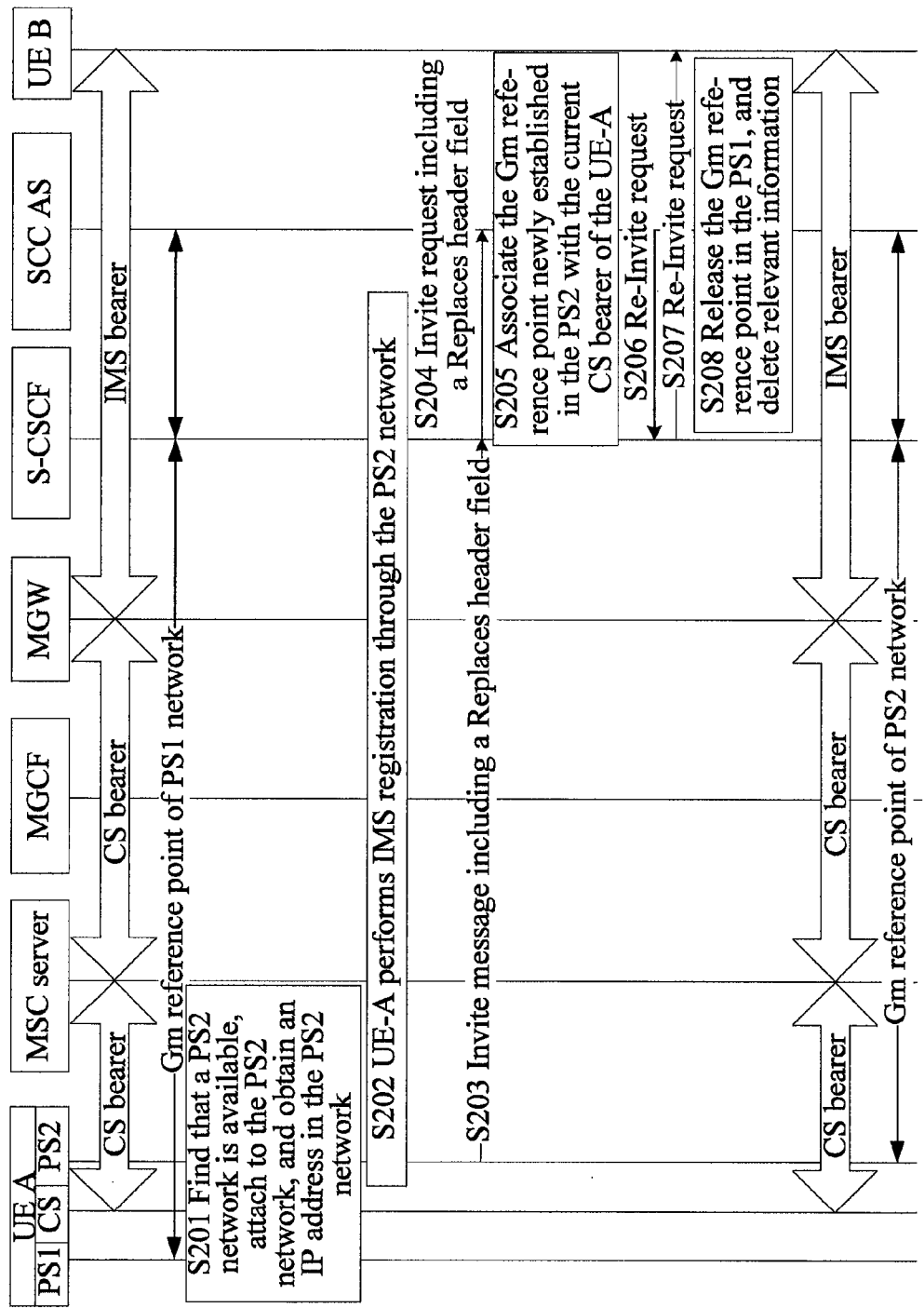
FIG. 3 is a flow chart of the implementation of a first embodiment of a method for transferring a Service Control Signalling Path of the present invention.

FIG. 3 is a flow chart of the implementation of a first embodiment of a method for transferring a Service Control Signalling Path of the present invention.

The method includes the following steps:

In step S201, when a UE-A determines that a first PS network (that is, a PS1 network where a current Gm reference point is located) is unavailable, if a second PS network (assumed to be a PS2 network) is found available, the UE-A is attached in the PS2 network and obtains an IP address in the PS2 network.

In step S202, the UE-A performs IMS registration via the PS2 network.

In step S203, the UE-A initiates a transfer request via the PS2 network. In this embodiment, the transfer request may be an Invite request, and the Invite request includes Gm reference point information of the PS1 network and indication information for establishing the Gm reference point. The Gm reference point information of the PS1 network includes a Session Identity (Session ID) of the Gm reference point, that is, Call-identity header field+From tag header field+To tag header field (Call-ID+From tag+To tag). The Invite request may carry a preset field, and the field may be a Replaces header field, and the Gm reference point information of the PS1 network is set in the Replaces header field. The indication information for establishing the Gm reference point is used to trigger a network side to perform an Gm reference point transfer process, and may be information for indicating that the bearer of the UE-A is in the CS network.

A called address of the Invite request may be an address of the SCC AS (that is, an SCC AS PSI), or an address of the opposite end UE-B.

In step S204, the S-CSCF sends the Invite request to the SCC AS.

In step S205, the SCC AS receives the Invite request, determines to transfer the Gm reference point according the information indicating that the bearer of the UE-A is in the CS network, and further obtains the Session ID stored in the Replaces header field according to the Invite request, and obtains the Session ID of the Gm reference point of the PS2 network (because the Session ID is sent via the PS2 network, the network side can obtain the Gm reference point information of the PS2 network, where the Gm reference point information mainly includes the Session ID), the Gm reference point newly established in the PS2 is associated with the current CS bearer of the UE-A (the current CS bearer of the UE-A may be obtained by the SCC AS when the UE-A establishes the Gm reference point of the PS1 network with the network side).

In step S206, the SCC AS sends a Re-Invite request to the S-CSCF, where the Re-Invite request includes an IP address of the UE-A.

In step S207, the S-CSCF sends the Re-Invite request to the opposite end UE-B, and the UE-B uses the IP address of the UE-A in the Re-Invite request to update the existing IP address of the UE-A.

In step S208, the SCC AS releases the Gm reference point in the PS1, and deletes relevant information.

It should be noted that, the UE-A may detect other PS networks (for example, PS2), when determining that the PSI network where the current Gm reference point is located is unavailable, and when it is determined that the PS2 network is available, the UE-A is attached to the PS2 network and obtains an IP address in the PS2 network. The UE-A may also detect other networks when the PSI network where the current Gm reference point is located is still available, and when it is determined that the PS2 network is available, the UE-A is attached to the PS2 network, obtains an IP address in the PS2 network, and performs IMS registration in the PS2 network. In this case, when the UE-A moves to a position where the PS1 becomes unavailable, step S203 is directly performed.

According to the embodiment of the present invention, when the PS network where the current Gm reference point is located is unavailable, the current Gm reference point is replaced with a Gm reference point of a new and available PS network, so as to ensure smooth data transmission. It is assumed that the network where the original Gm reference point of the UE-A is located is a PS1 network, and the UE-A transports a large amount of data through the Gm reference point, when the PS1 network is unavailable, the existing method is to abandon the Gm reference point and use an I1 reference point to continue to transport the data. In this case, compared with the Gm reference point, adopting the I1 reference point for transmission, the efficiency of data transmission is decreased, and even some data cannot be transported smoothly. However, in the present invention, the Gm reference point of the new and available PS network is used for data transmission, so as to ensure smooth data transmission.

It should be noted that, special attention needs to be paid on the continuity of the session when the UE moves between different PS networks, and the IMS Service Continuity (ISC) studies the session continuity when the UE moves between different PS networks, that is, when the user moves, the PS network may be transferred without interrupting the session. Similar to the ICS, the core of the ISC is also the SCC AS, and the SCC AS completes the handover function of call branch between different PS networks. When an ISC UE in a connection state detects that the surrounding wireless environment changes or meets a certain condition, the ISC UE will be handed over according to a pre-defined switch policy. The ISC UE initiates a handover request to the SCC AS from a PS network to which the ISC UE is handed over, and the SCC AS establishes a connection with the ISC UE at the PS network to which the ISC UE is handed over, and hands over the remote session connection onto the new connection, and at the same time, releases the session connection of the PS network.

Session Transfer Identifier (STI) is an identifier indicating to initiate a session transfer, and may be dynamically allocated by the SCC AS or pre-stored in the UE. When the user wants to hand over the Service Control Signalling Path, the user initiates a call with the STI as a called number, and the SCC AS determines that the call is a session transfer request according to the called number and obtains the Session ID of the current Service Control Signalling Path.

Figure 4:
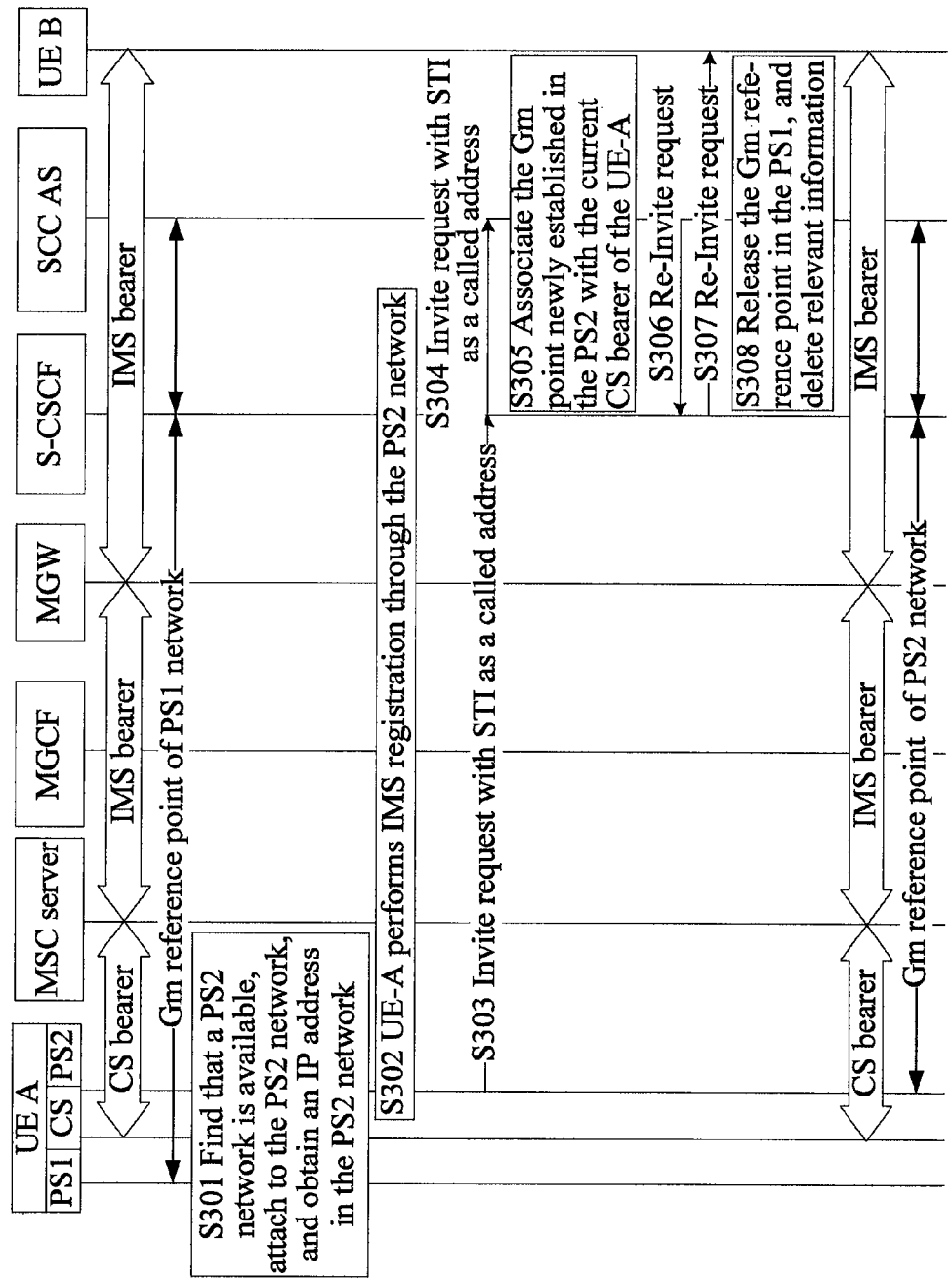
FIG. 4 is a flow chart of the implementation of a second embodiment of a method for transferring a Service Control Signalling Path of the present invention.

Accordingly, in another embodiment of the present invention, the UE-A sends a session transfer request in the new PS network, that is, initiates a call with the STI as the called number, to trigger the network side to perform Gm reference point transfer: after receiving the session transfer request, the SCC AS performs a Gm reference point transfer from the Gm reference point of the old PS network to the Gm reference point of the new PS network, and deletes relevant information of the Gm reference point of the old PS network. FIG. 4 is a flow chart of the implementation of a second embodiment of a method for transferring a Service Control Signalling Path of the present invention.

Referring to FIG. 4, the method includes the following steps:

Steps S301-S302 are the same as steps S201-S202 in the first embodiment.

In step S303, the UE-A initiates an Invite request via a PS2 network, where a called address of the Invite request is an STI, and the Invite request includes information indicating that the bearer is a CS network.

The Invite request first arrives at an S-CSCF.

In step S304, the S-CSCF sends the Invite request to the SCC AS.

In step S305, the SCC AS determines that UE-A initiates Gm reference point transfer according to the information indicating that the bearer is in the CS network in the Invite request and a situation that the called address of the Invite request is the STI, and associates the Gm reference point newly established in a PS2 network with a current CS bearer of the UE-A.

In step S306, the SCC AS sends a Re-Invite request to the S-CSCF, where the Re-Invite request includes an IP address of the UE-A.

In step S307, the S-CSCF sends the Re-Invite request to the opposite end UE-B, and the UE-B uses the IP address of the UE-A in the Re-Invite request to update the existing IP address of the UE-A.

In step S308, the SCC AS releases the Gm reference point in the PS1, and deletes relevant information.

It should be noted that, the information for indicating that the bearer of the UE-A is in the CS network in the Invite request serves as indication information for establishing the Gm reference point to trigger the network to perform a Gm reference point transfer process. In embodiments other than the embodiment described above, the indication information for establishing the Gm reference point may be other information.

Corresponding to the method embodiment, in an embodiment, the present invention further provides a device for transferring a Service Control Signalling Path.

Figure 5:
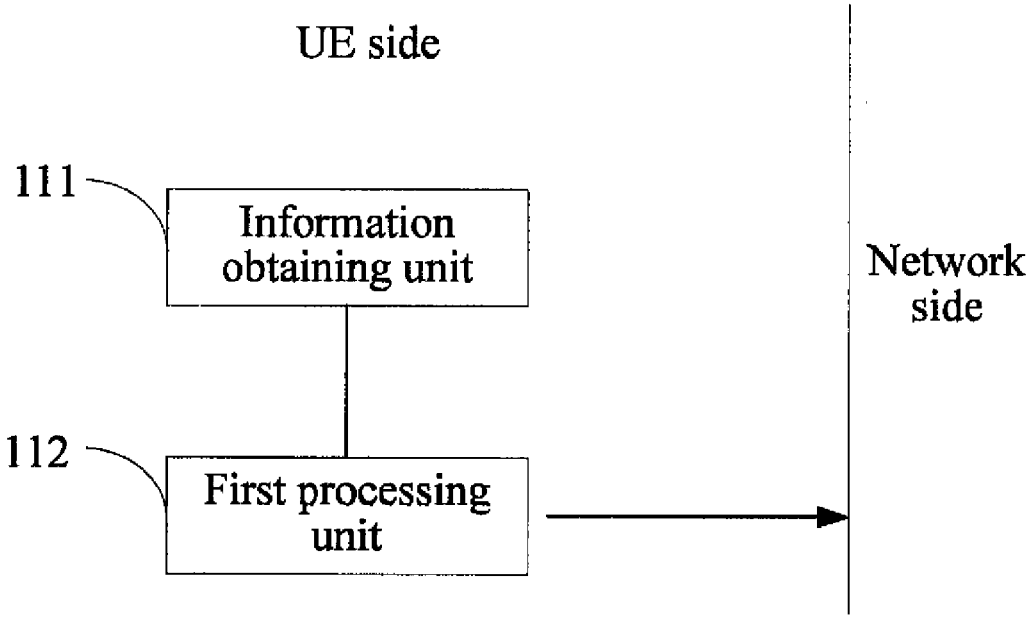
FIG. 5 is a schematic structural view of a first embodiment of a device for transferring a Service Control Signalling Path of the present invention.

FIG. 5 is a schematic structural view of a first embodiment of a device for transferring a Service Control Signalling Path.

Referring to FIG. 5, the device for transferring a Service Control Signalling Path includes an information obtaining unit 111 and a first processing unit 112.

The operation procedure and operation principle of the device are as follows:

It is assumed that a Service Control Signalling Path (that is, Gm reference point) of the PS network exists between the UE-A and the SCC AS of the network side, and the PS network where the Gm reference point is located is the PS1 network, wherein the bearer of the UE-A is in the CS network. When the UE-A needs to switch the currently used Gm reference point (for example, replace the current Gm reference point with a Gm reference point of an available PS2 network), the operations of the device are as follows:

The information obtaining unit 111 obtains Gm reference point information of the PS1 network, and the Gm reference point information includes a Session ID of the Gm reference point of the PS1 network, that is, Call-ID+From tag+To tag.

The first processing unit 112 sends a transfer request via the PS2 network, and the transfer request may be an Invite request, and is used to provide the Gm reference point information of the PS1 network, Gm reference point information of the PS2 network, and indication information for establishing the Gm reference point to the network side.

As the Invite request is sent via the PS2 network, the network side may obtain the Gm reference point information of the PS2 network.

The first processing unit 112 provides the Gm reference point information of the PS2 network and the trigger information to the network side by sending the Invite request in the following two modes.

1. The Invite request includes the Gm reference point information of the PS1 network and the indication information for establishing the Gm reference point, and in this case, a called address of the Invite request may be an address of the network side SCC AS (that is, SCC AS PSI), or an address of the UE-B.

2. The Invite request includes the indication information for establishing the Gm reference point, and the called address of the Invite request is an STI; the network side may obtain the Gm reference point information of the PS1 network according to the STI, and obtain the indication information for establishing the Gm reference point according to the Invite request.

The indication information for establishing the Gm reference point is used to trigger the network side to perform the operation of transferring the Gm reference point, that is, the network side may determine that the UE-A initiates a request of transferring the Gm reference point according to the indication information for establishing the Gm reference point. Through the Gm reference point information (that is, Session ID) of the PS1 network and the Gm reference point information (that is, Session ID) of the PS2 network, the Gm reference point of the PS2 network is associated with the bearer of the UE-A. The Gm reference point in the PS1 network is released and relevant information is deleted, the IP address of the UE-A in the PS2 network is sent to the UE-B, and the UE-B updates the stored IP address of the UE-A.

The indication information for establishing the Gm reference point may be information for indicating that the bearer of the UE-A is in the CS network, and definitely may be other information.

Figure 6:
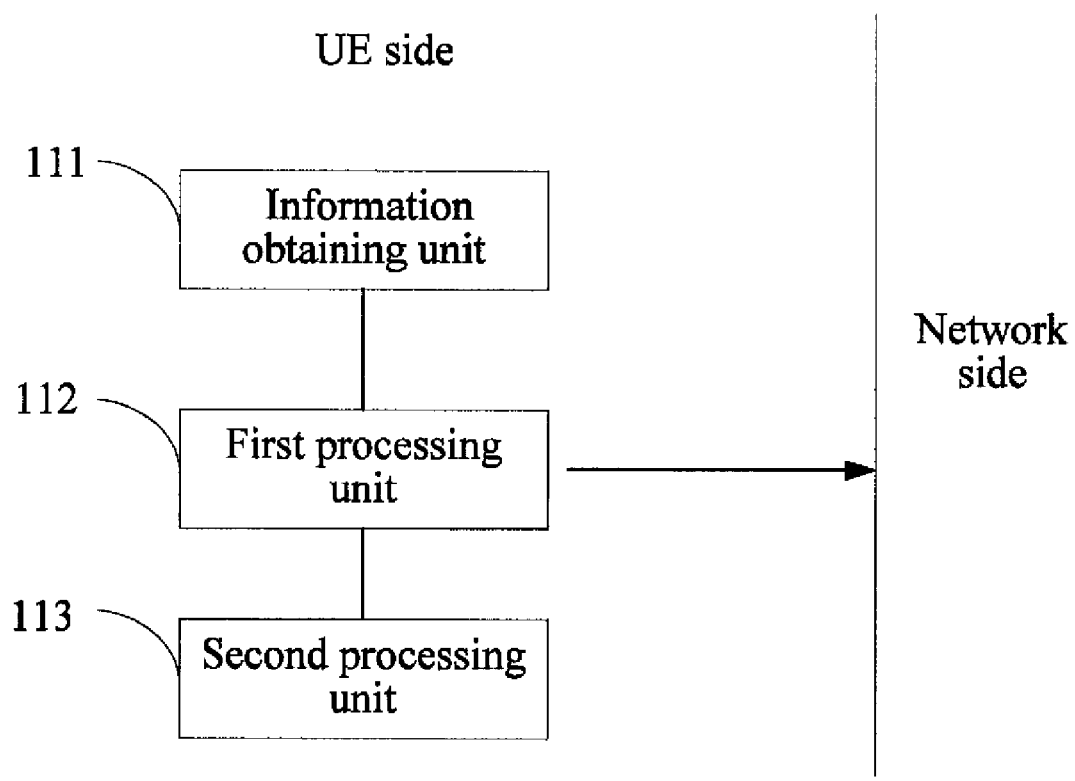
FIG. 6 is a schematic structural view of a second embodiment of a device for transferring a Service Control Signalling Path of the present invention.

FIG. 6 is a schematic structural view of a second embodiment of a device for transferring a Service Control Signalling Path.

Referring to FIG. 6, the first processing unit 112 may send the Invite request when the PSI network is unavailable. Thus, the device for transferring a Service Control Signalling Path may further include a second processing unit 113 based on the first embodiment. The second processing unit 113 is configured to determine whether the PS1 network is available, and provide a result to the first processing unit 112, and the first processing unit 112 sends the Invite request when the PS1 network is unavailable.

In all the embodiments, before the second processing unit 113 determines that the PS1 network is unavailable, the UE-A where the device for transferring a Service Control Signalling Path is located has performed IMS registration via the PS2 network. It should be noted that, in other embodiments, the operation of performing the IMS registration by the UE-A may be performed when the second processing unit 113 determines that the PS1 network is unavailable.

Figure 7:
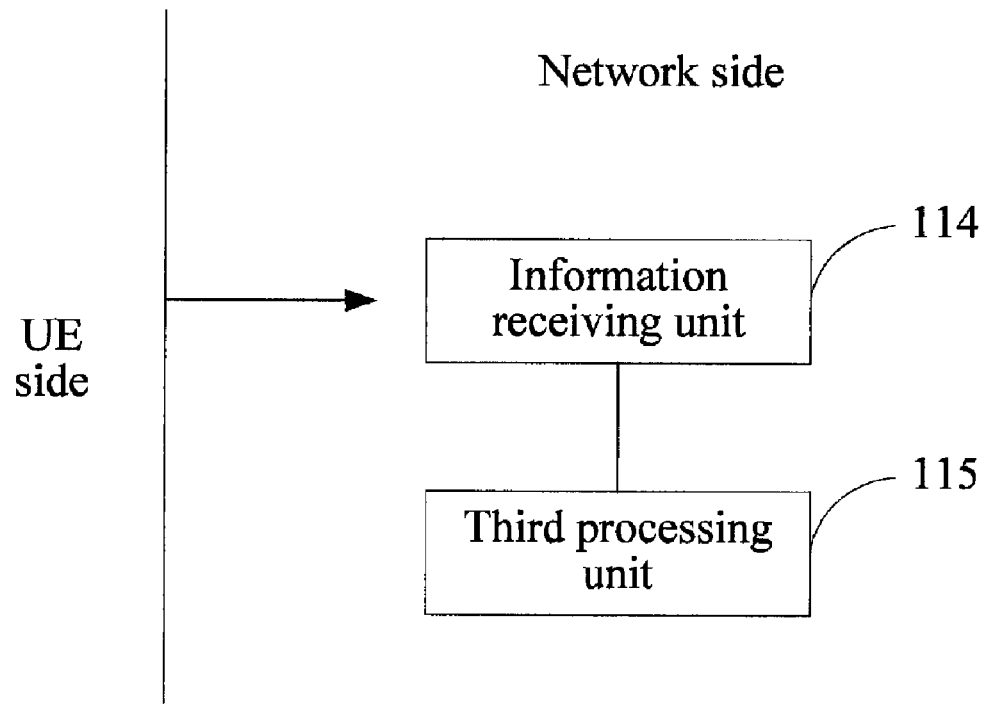
FIG. 7 is a schematic structural view of a third embodiment of a device for transferring a Service Control Signalling Path of the present invention.

FIG. 7 is a schematic structural view of a third embodiment of a device for transferring a Service Control Signalling Path.

As shown in FIG. 7, the device for transferring a Service Control Signalling Path is located at the network side, and includes an information receiving unit 114 and a third processing unit 115.

A session exists between a UE-A and a UE-B, and the Service Control Signalling Path of the session is the Gm reference point of the PS1 network. After the UE-A sends the Invite request via the PS2 network, the information receiving unit 114 receives the Invite request, and obtains Gm reference point information of the PS1 network according to the Invite request, Gm reference point information of the PS2 network, and indication information for establishing the Gm reference point.

The third processing unit 115 determines to perform the Gm reference point transfer process according to the indication information for establishing the Gm reference point in the Invite request (the indication information for establishing the Gm reference point may be the information indicating that the bearer of the UE-A is in the CS network): the third processing unit 115 associates the Gm reference point of the PS2 network with the bearer of the UE-A according to the Gm reference point information of the PS1 network and the Gm reference point information of the PS2 network, releases the Gm reference point of the PS1 network, and deletes the relevant information. Furthermore, the third processing unit 115 obtains a new IP address of the UE-A in the Gm reference point information of the PS2 network, and sends the IP address to the US-B by using a Re-Invite request, so that the UE-B may update the IP address originally stored in the UE-A.

In an embodiment, the present invention further provides a User Equipment (UE). The difference between the UE and an existing UE lies in that, the UE has a device for transferring a Service Control Signalling Path, and the device may be the device of the first embodiment or the second embodiment. By using the device, the UE is capable of sending information to trigger the network side to perform a Gm reference point transfer from the current Gm reference point to a Gm reference point of a new and available PS network when the PS network where the current Gm reference point is located is unavailable, so as to ensure smooth data transmission.

Furthermore, in an embodiment, the present invention further provides network equipment, which may be an SCC AS, and includes the device for transferring a Service Control Signalling Path of the third device embodiment. By using the device, after receiving the Invite request from the UE, the SCC AS starts the Gm reference point transfer process according to the trigger information in the Invite request: according to the Gm reference point information of the original PS network and the Gm reference point information of the new PS network carried in the Invite request, the SCC AS performs a Gm reference point transfer from the Gm reference point of the original PS network to the Gm reference point of the new PS network.

Persons of ordinary skill in the art may understand that information, messages, and signals may be represented by using any one of many different techniques and technologies. For example, the messages and information in the above description may be represented as voltages, currents, electromagnetic waves, magnetic fields or magnetic particles, optical fields, or a combination thereof.

Persons of ordinary skill in the art can further understand that, the units and the steps of algorithms according to the embodiments of the present invention may be implemented by electronic hardware, computer software, or a combination thereof. To illustrate the interchangeability of the hardware and the software, the compositions and steps of the embodiments are generally described according to functions in the above description. Whether the functions are performed as hardware or software is dependent on the specific applications and design constraints of the technical solutions. Persons of ordinary skill can use different methods for each specific application to realize the described functions, and such realization does not exceed the scope of the present invention.

The steps of the methods and algorithms according to the embodiments of the present invention may be implemented by hardware, software modules executed by a processor, or a combination thereof. The software modules may be stored in a storage medium, for example, random access memory (RAM), memory, read-only memory (ROM), electrically programmable ROM, electrically erasable and programmable ROM, register, hard disk, removable disk, CD-ROM, or any other storage media known in the industry.

Based on the description of the embodiments, persons of the ordinary skill in the art can implement or apply the present invention. Various modifications of the embodiments are apparent to persons of ordinary skill in the art, and general principles defined in the specification can be implemented in other embodiments without departing from the scope of the present invention. Therefore, the present invention is not limited to the embodiments in the specification, but intends to cover the most extensive scope consistent with the principle and the novel features disclosed in the specification.

What is claimed is:

1. A method for transferring a Service Control Signalling Path, comprising:
   establishing, by User Equipment (UE), a connection with an opposite end, wherein the UE uses a Circuit Switched (CS) bearer in a CS network and a Service Control Signalling Path in a first Packet Switched (PS) network; and
   sending a transfer request via a second PS network to instruct a network side to transfer the Service Control Signalling Path according to the transfer request;
   wherein the transfer request carries Service Control Signalling Path information of the first PS network and indication information for establishing a Service Control Signalling Path;
   wherein the Service Control Signalling Path information of the first PS network comprises: a Session identity (Session ID) of the Service Control Signalling Path of the first PS network, and the Session ID comprises a Call-ID header field, a From tag header field and a To tag header field.

2. The method according to claim 1, wherein the sending the transfer request via the second PS network comprises:
   sending the transfer request via the second PS network when the first PS network is unavailable.

3. The method according to claim 1, wherein a Replaces header field is set in the transfer request, and the Service Control Signalling Path information of the first PS network is set in the header field.

4. The method according to claim 1, wherein the indication information for establishing the Service Control Signalling Path is information indicating that the bearer is in the CS network.

5. The method according to claim 1, wherein the Service Control Signalling Path in the second PS is associated with the CS bearer of the UE after the network side transfers the Service Control Signalling Path according to the transfer request.

6. A method for transferring a Service Control Signalling Path, comprising:
   receiving a transfer request sent by User Equipment (UE) via a second Packet Switched (PS) network, wherein the UE uses a Circuit Switched (CS) bearer in a CS network and a Service Control Signalling Path in a first PS network; and
   transferring the Service Control Signalling Path according to the transfer request;

wherein the transfer request carries Service Control Signalling Path information of the first PS network and indication information for establishing a Service Control Signalling Path;

wherein the Service Control Signalling Path information of the first PS network comprises: a Session identity (Session ID) of the Service Control Signalling Path of the first PS network, and the Session ID comprises a Call-ID header field, a From tag header field and a To tag header field.

7. The method according to claim 6, wherein a Replaces header field is set in the transfer request, and the Service Control Signalling Path information of the first PS network is set in the header field.

8. The method according to claim 6, wherein the indication information is information indicating that the bearer is in the CS network.

9. The method according to claim 6, wherein after transferring the Service Control Signalling Path according to the transfer request, associating the Service Control Signalling Path in the second PS with the CS bearer of the UE.

* * * * *